UNITED STATES PATENT OFFICE.

L. D. GALE, OF WASHINGTON, DISTRICT OF COLUMBIA.

IMPROVEMENT IN TREATING PHOSPHATIC GUANOS.

Specification forming part of Letters Patent No. 38,040, dated March 31, 1863.

*To all whom it may concern:*

Be it known that I, LEONARD D. GALE, of the city of Washington, District of Columbia, have invented a certain new and useful method of treating phosphatic guanos by combining them with animal matters previously converted into ammoniacal products; and I hereby declare that the following is a full and sufficient description thereof.

I prepare a phosphatic guano by supplying it with ammoniacal salts and soluble phosphates by a method of treatment at once cheap, simple, and expeditious. I do the work by preparing and treating animal matter with heat and acid, or the equivalent thereof, converting its nitrogen into ammoniacal salts, and holding the same in a fixed state till it is ready to be applied to the lands. I also convert the insoluble phosphoric acid contained in the guano into soluble phosphoric acid applicable directly to the soil.

The result of the process is a factitious guano having the qualities of Peruvian guano so far as the ammoniacal salts are concerned, and which constitute the stimulating properties of the compound, and having an abundant supply of soluble phosphates for the current growth of the seed or substance of the crop.

The phosphatic guanos—so called because phosphates predominate in them in the same manner as ammoniacal compounds predominate in the Peruvian guano—are mostly obtained from the Pacific Ocean, near the equator, and between 150° and 180° west longitude from London. They contain a large percentage of phosphate of lime and of magnesia in the insoluble state, amounting in that of Howland and Baker Islands to seventy per cent. or more, while the ammonia is usually very little, hardly exceeding one or two per cent. The organic matter in these guanos has been mostly washed away by the rains, while the phosphates, being comparatively insoluble in water, remain.

Phosphatic guanos as brought from the above guano islands are defective in ammoniacal ingredients, and also from the phosphates being in the insoluble state. The object of the present invention is to obviate both of these defects, and supply ammonia and solubility to the phosphates.

Ammonia is supplied from the soft parts of animals, as muscle and viscera, and may be from quadrupeds or fish, tainted meats of the markets, dead horses, and other animals, as herring, moss-bunkers, or menhaden, are all resources about maritime towns for supplying animal matter for ammonia; but it happens that these different animal materials, when allowed to decompose by themselves, yield a large amount of carbonate of ammonia, which, being volatile, escapes into the air at ordinary temperatures and is lost.

It is one of the objects of this invention to retain the ammonia in a non-volatile state. This end is attained and the change produced at once by treating the animal matter with acid, as sulphuric, nitric, hydrochloric, &c. These acids attack the animal matter, deprive it of its water, and convert at once the nitrogenous matters into ammonia or ammonia-yielding products, and unite with it as fast as formed, producing sulphate, nitrate, hydrochlorate, &c., of ammonia, either of which salts is permanent in the atmosphere, and is prepared to be applied directly to the roots of plants.

The insoluble phosphates are converted into soluble phosphates by means of the same acid that is used to form ammonia from animal matter. Consequently the same acid used for the animal matter is added in sufficient quantity to cover both results, which is done by adding the whole amount of acid to the animal matter in the corroding-vat. Subsequently the changed animal matter and the excess of acid not expended on the animal matter are together mixed with the phosphatic guano in such proportions of the latter that the free acid contained in excess shall convert the whole or any part of the insoluble phosphates into soluble phosphates, as the particular guano selected or the wants of the farmer may demand.

The amount of acid used in the process is no part of this invention, but only the product of the corroding action of the said acid acting on the animal matter and on the insoluble phosphates when such product is mixed with the guano in question.

Although the parties who are to work this material design to use the Howland Island guano, which contains over seventy per cent. of the insoluble phosphates, they may conclude to use other guanos of the same class, or other phosphates, but containing a different percentage of insoluble phosphates and require a different proportion of the sulphuric or other acid to be used in the operation. Hence the proportion of acid required will depend on the kind of guano and the amount of phosphates contained therein.

In the present application it is designed to use Howland Island guano and such strength of acid as will furnish five hundred and forty pounds of dry superphosphate of lime, equal to above twenty-six per cent. of soluble phosphate applicable to the current year's crop.

The animal matter contains sixty-three to seventy-five per cent. of water of combination, leaving a balance of oleaginous and nitrogenous matter together equal to thirty-seven or twenty-five per cent, supposing the materials to have been dried at 212° Fahrenheit. A ton of fish in the green state have been found to yield two and one-half per cent. of actual ammonia. Fish yield the least and flesh fiber the greatest percentage of ammonia; but there is still left a certain amount of animal matter not yet converted to ammonia, but is converted subsequently by gypsum.

It is not necessary to confine the manufacturer to the use of sulphuric, nitric, hydrochloric, or any free acid, as salts of these acids with certain basis—as magnesia, alumina, iron, manganese, &c.—may be substituted for the free acid, but sulphuric acid is generally preferred to all other agents, because cheaper and more rapid in producing the result. The rule to be observed in the use of a salt—as the sulphate of iron copperas—is that this salt may be used when a pound of sulphuric acid contained in a given weight of the salt shall not cost more than a pound of the same acid in a free state. Otherwise the free sulphuric acid is cheapest and best.

To prepare the copperas and test its cheapness, weigh out one hundred parts, grains, or ounces, pulverize it in a mortar and spread it thinly on paper in the sun for one day, and then weigh it again. The difference in the two weighings shows the amount of water of crystallization dried out of it. The dried copperas is now ready to be mixed with the animal matter in the following proportions: Every seven hundred pounds of the dried copperas contains two hundred pounds of sulphuric acid. To the seven hundred pounds of dried copperas, just before being mixed in the corroding-vat, there should be added by sprinkling over it some ten pounds of sulphuric acid, for the purpose of vigorously commencing the operation.

Operation: The animal matter and the copperas, dried as aforesaid, are equally mixed viz: Seven hundred pounds copperas, ten pounds sulphuric acid, and nineteen hundred pounds of animal matter are duly mixed in the corroding-vat and boiled until the animal matter shall be broken down and reduced to a gelatinous mass. Should these materials be too dry to admit of stirring, then a little water may be added to commence the boiling. Fresh animal matter will not need the water; but as sulphuric acid can be bought in the market for two and one-fourth cents per pound it is clearly the cheapest material that can be used. Besides the above, there is an acid in commerce called "sulphuric acid of the chamber," or "pan acid," which can be bought at two cents pound, and of less strength than the ordinary the acid of commerce.

If sulphuric acid be used, the operation is as follows: One hundred parts of soft animal matter is boiled with three to five per cent. of sulphuric acid till the animal matter is reduced to a gelatinous mass. This acid is sufficient for the converting of the animal matter into ammoniacal matter, but does not provide for preparing the soluble or super phosphate of lime. For this purpose there is added to the animal matter and acid, in proportions above stated, so much additional sulphuric acid as is necessary to convert all or part of the insoluble phosphates contained in the guano or its equivalent to soluble phosphates, (superphosphates,) and these proportions can be easily obtained by any one familiar with the subject from a chemical analysis of the crude guano or material operated on.

I will suppose, for the sake of illustration, that crude menhaden, one ton and a half, is put into a suitable boiling-vat with one hundred and forty pounds of sulphuric acid to convert the nitrogenous matter into ammonia, and one hundred and twenty pounds to convert the insoluble phosphates into superphosphates or soluble phosphates, and the mass heated to the boiling-point and boiled for one hour and as much longer as necessary to convert the whole to a jelly-like mass, when the oil is allowed to flow off on one side of the vat, and the animal matter is removed upon a drying-platform on the other side, suitably heated. On this drying-platform and contents of the vat are evenly spread some six hundred pounds of pulverized gypsum and thoroughly mixed with the contents discharged from the vat, and the whole well dried, ready to be mixed with the crude guano or its equivalent, in proportions according to the design of the manufacturer.

Two important ends are attained by this process—viz., separating nitrogenous matter from the oil and the use of gypsum.

The oil of fishes is usually separated by first boiling in water, and then pressing out by hydraulic power the oil, which process requires four or five hours.

The acid process is completed in one hour, converts the animal matter to a jelly, and the oil flows out and rises to the surface by its levity, requiring no press. The water-boiling process does not disorganize the animal matter; but the acid process does break down the fibrous matter into a semi-liquid mass, and the oil runs off without any mixture of foreign matter. Pressing, on the contrary, forces out much gelatinous and other animal matter, which partially mixes with the oil and forms the waste usually called "foots." The oil is of little value as a manure, but very valuable as an oil, and thus becomes a part of the consideration, and pays, when fish are used, a large part of the expense of separating the animal matter from the oil; and although separating oil as a product is not claimed in this application, yet the separation of the nitrogenous part from the oil is very valuable to the manure-manufacturer, as it saves him three hours fully at each boiling operation, and fuel, it will be remembered, constitutes a large part of the expense of the process. This process of separating nitrogenous and oleaginous matter by means of acid or its equivalent is therefore regarded as new and patentable, and is claimed as such.

The use of gypsum performs also important functions in this process. In the first place, it acts the part of an absorber of the sulphuric acid used in excess and reserved for rendering soluble the insoluble phosphates when the gypsum and animal matter are mixed with the guano. The gypsum, not being acted on by the sulphuric acid, merely absorbs and retains it. The gypsum is also a concentrated manure of itself, and increases on that account the value of the manure. In the second place, the gypsum performs a most valuable service to the agriculturist, by absorbing, condensing, and fixing the ammonia of the atmosphere, as well as the carbonate of ammonia, and converting it into a fixed salt—the sulphate of ammonia. Besides this, the gypsum, being kept in contact with all the animal matter not yet converted to ammonia by the presence of the acid in the boiling-vat, continually acts on the same until all the animal matter is changed into nutriment for the plant.

Having stated the nature of the invention and the several modes of working the same, I do not claim treating animal matter with acids or their equivalents, nor the mixing of animal matter with phosphatic guanos; nor do I claim any fixed proportion of animal matter, however prepared, with phosphatic guanos; but

What I claim as my invention, and desire to secure by Letters Patent, is—

1. Making a concentrated manure by mixing animal matter previously treated with acid or its equivalent with the guano, substantially in the manner and for the purpose set forth.

2. The use of sulphate of lime in combination with the animal matter treated previously, substantially in the manner and for the purpose set forth.

3. The use of the acids, substantially as set forth, for separating the nitrogenous material from the oil, whereby both products are rendered quicker and in a purer state than when separated by boiling or steaming with water only.

L. D. GALE.

Witnesses:
G. W. BENSON,
DANL. SEIXAS.